United States Patent [19]

Kitamura

[11] Patent Number: 5,181,751
[45] Date of Patent: Jan. 26, 1993

[54] QUICK CONNECTOR

[75] Inventor: Hirokazu Kitamura, Kasugai, Japan

[73] Assignee: Tokai Rubber Industries, Ltd., Komaki, Japan

[21] Appl. No.: 618,412

[22] Filed: Nov. 27, 1990

[30] Foreign Application Priority Data

May 31, 1990 [JP] Japan .................................. 2-144186

[51] Int. Cl.$^5$ ............................................. F16L 35/00
[52] U.S. Cl. ..................................... 285/39; 285/308; 285/322; 285/921
[58] Field of Search ................. 285/322, 323, 319, 39, 285/94, 375, 308

[56] References Cited

U.S. PATENT DOCUMENTS

| 4,195,812 | 4/1980 | Norcross | 285/322 X |
| 4,540,201 | 9/1985 | Richardson | 285/322 X |
| 4,601,497 | 7/1986 | Bartholomew | |
| 4,889,368 | 12/1989 | Laipply | 285/921 X |
| 4,905,964 | 3/1990 | Shiozaki | |
| 4,943,091 | 7/1990 | Bartholomew | 285/921 X |

FOREIGN PATENT DOCUMENTS

| 306126 | 3/1989 | European Pat. Off. |
| 3914645 | 11/1989 | Fed. Rep. of Germany |
| 64-41794 | 3/1989 | Japan |
| 2089455 | 6/1982 | United Kingdom |
| 2104607 | 3/1983 | United Kingdom |

Primary Examiner—Dave W. Arola
Attorney, Agent, or Firm—Jacobson, Price, Holman & Stern

[57] ABSTRACT

A quick connector includes a first member, a second member, an engager claw member and an urging member. The first member includes a first tube and a ring-shaped projection. The second member includes a socket at an end thereof, the socket including a tapered regulatory inner peripheral surface. The engager claw member is made movable in an axial direction of the socket, disposed in the second member, and includes a ring-shaped base, a plurality of arms being deformable in a radial direction and a claw extending from an end of the arms and engaging with the ring-shaped projection of the first member. The urging member presses the engager claw member onto the tapered regulatory inner peripheral surface of the socket, and urges the claw inwardly in a radial direction. Thus, in the quick connector, enhanced engagement can be achieved between the claw of the engager claw member and the ring-shaped projection of the first member, thereby securely preventing the first member and the second member from relatively moving in a direction being perpendicular to an axial direction and in an axial direction.

13 Claims, 5 Drawing Sheets

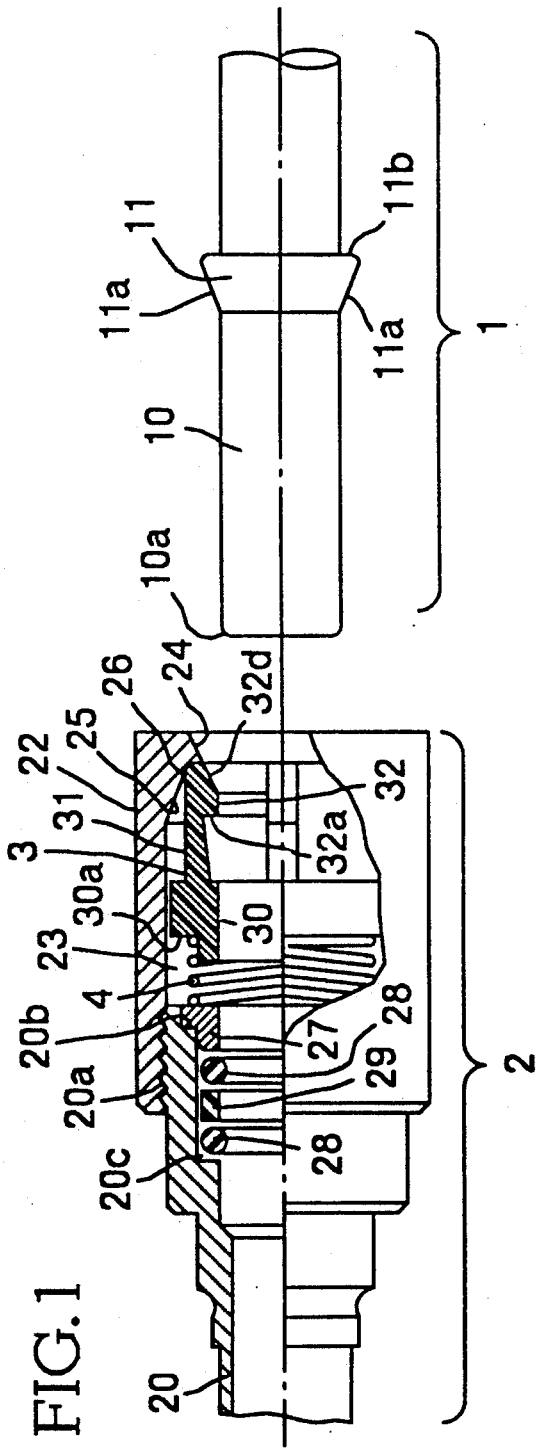

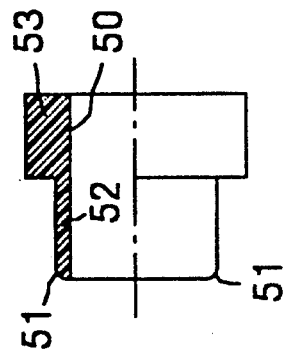
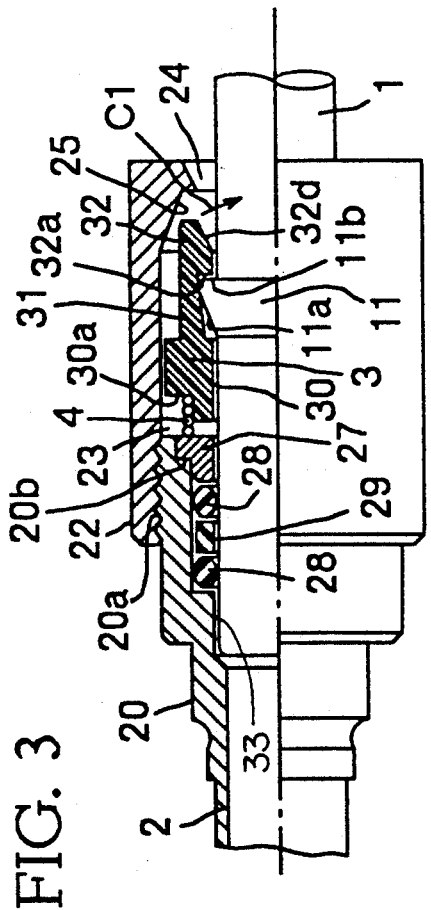
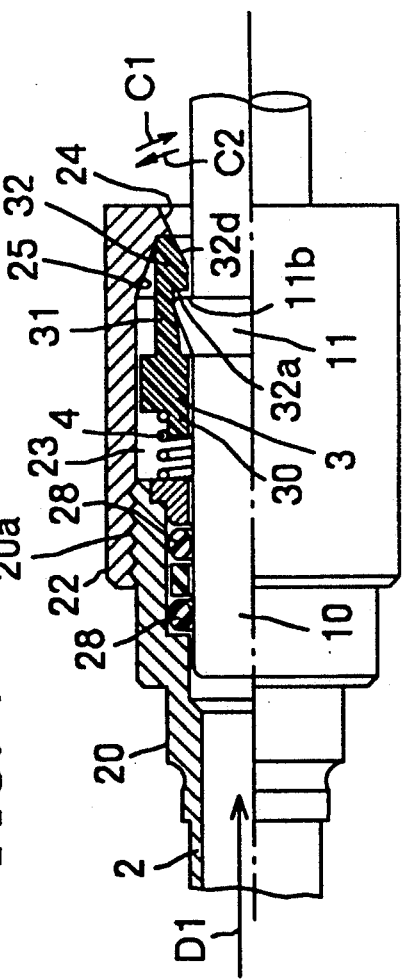

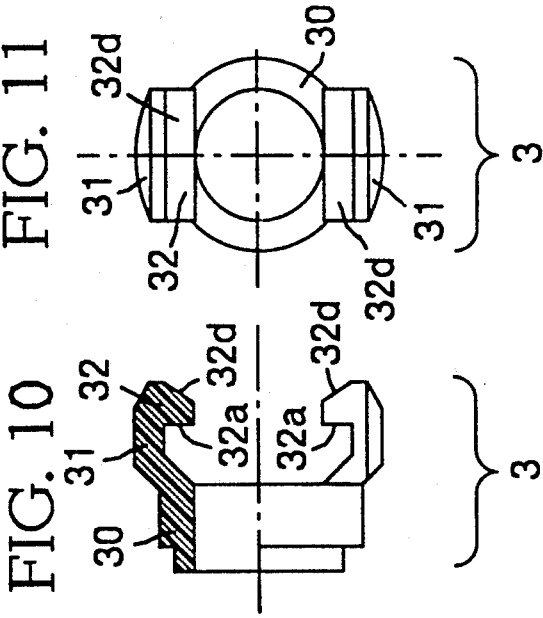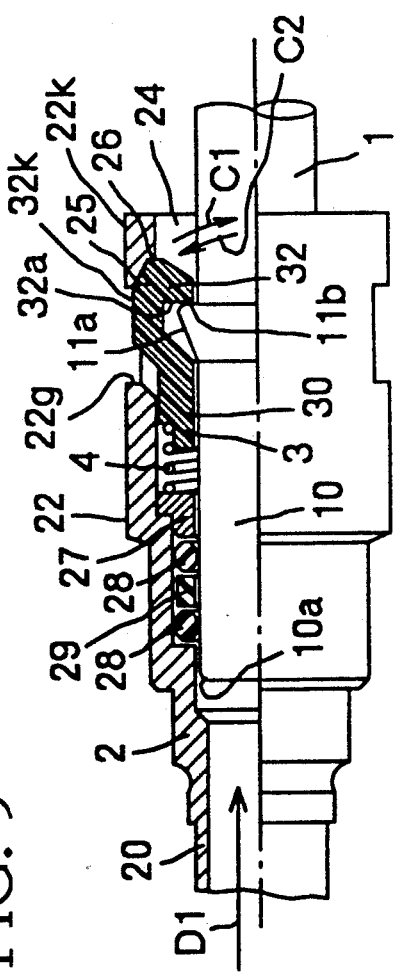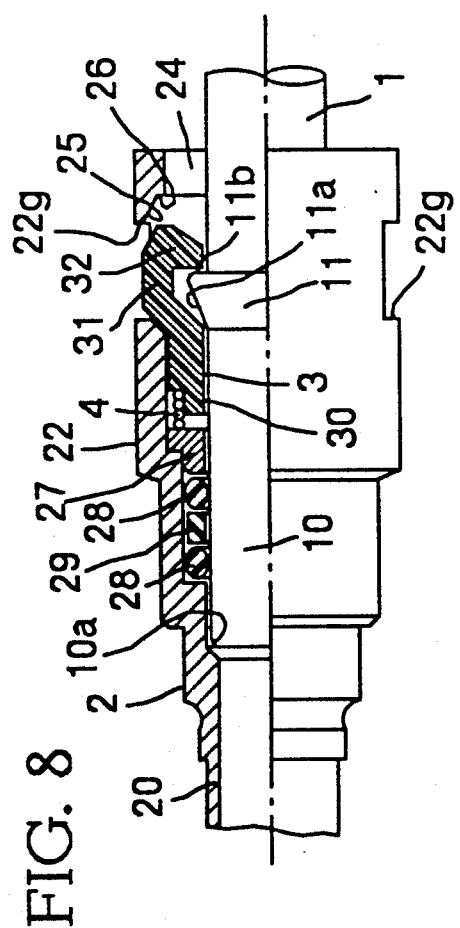

QUICK CONNECTOR

BACKGROUND OF THE INVENTION

1. Field of the Invention

The present invention relates to a connector for piping for connecting hoses which are employed to transfer a fluid such as gasoline, oil, water, air and the like.

2. Description of the Prior Art

As disclosed in Japanese Unexamined Utility Model Publication (KOKAI) No. 41794/1989 and illustrated in FIG. 12, a fitting for piping for connecting hoses has been known so far. The fitting for piping comprises a cylinder-shaped fitting body 300, annular seal numbers 500 disposed on an inner-peripheral surface of the fitting body 300 and on an outer peripheral surface of a pipe 400 disposed in the fitting body 300, a retainer member 600 disposed in the fitting body 300 and assembled on an outer peripheral surface of the pipe 400 thereby retaining the seal members 500 and the pipe 400 in the fitting body 300.

The retainer member 600 is made of a flexible material. The retainer member 600 includes a tubular portion 661 having an inner diameter substantially equal to an outer diameter of the pipe 400, the tubular portion 661 which includes an annular groove 661a disposed at a rear and having an inner diameter being greater than the inner diameter of the tubular portion 661, and a plurality of leg portions 662 extending from a rear end of the tubular portion 661, bent outwardly and including a concaved groove 662a formed on an outer peripheral surface.

The retainer member 600 is inserted into the fitting body 300 at the tubular portion 661 thereof. The annular groove 661a of the retainer member 600 engages with an annular convexed portion 400a formed on an outer peripheral surface of the pipe 400, and the concaved groove 662a of the retainer member 600 engages with an annular flanged portion 300a formed on an inner peripheral surface of the fitting body 300 at a rear end, thereby holding the pipe 400 in the fitting body 300 and holding the seal members 500 with a front end of the tubular portion 661 by way of a bushing 700.

When the above-mentioned conventional fitting for piping is installed in a piping system and used actually, the pipe 400 is pressed in a direction coming out of the hose fitting body 300, the thus pressed pipe 400 is held by the leg portions 662 disposed between the annular groove 661a and the concaved groove 662a. Accordingly, the leg portions 62 are subjected to a flexural stress. Since the retainer member 6 is made of a flexible material, it is deformed and there arises rickety engagement between the fitting body 300 and the pipe 400. Further, when the fitting body 300 and the pipe 400 are subjected to an external force working in a direction being perpendicular to their axes, the leg portions 662 are again subjected to a flexural stress. Likewise, there arises rickety engagement between the fitting body 300 and the pipe 400. Thus, the conventional fitting for piping illustrated in FIG. 12 might damage the reliability of a total piping system.

SUMMARY OF THE INVENTION

The present invention has been developed in view of the above-mentioned circumstances. It is therefore an object of the present invention to provide a quick connector which exhibits a strong engagement force in a direction being prependicular to an axial direction, thereby giving a high reliability to a piping system.

The above object can be achieved by a quick connector of the present invention. The quick connector comprises:

a tubular-shaped first member including a first tube having a predetermined outer diameter and a ring-shaped projection disposed on an outer peripheral surface of the first tube and projecting in a centrifugal direction;

a tubular-shaped second member including a socket at an end thereof, the socket including an opening for disposing an end of the first member therein and a tapered regulatory inner peripheral surface having a reducing inner diameter as it approaches to the opening, and convering an end of the first member disposed through the opening;

an engager claw member interposed between an inner peripheral surface of the socket and an outer peripheral surface of the first tube in a manner being movable in a direction of a central axis of the socket, the engager claw member including a ring-shaped base, a plurality of arms extending from the ring-shaped base to the opening in a direction of the central axis of the socket, the arms being deformable in a radial direction, and a claw extending from an end of the arms and engaging with the ring-shaped projection of the first member; and an urging member urging the engager claw member to the opening of the socket in a direction of the central axis of the socket, pressing the claw of the engaging claw member onto the tapered regulatory inner peripheral surface of the socket, and urging the claw inwardly in a radial direction simultaneously with the pressing, thereby enhancing engagement between the claw and the ring-shaped projection of the first member.

The quick connector of the present invention includes the regulatory inner peripheral surface formed on an inner peripheral surface of the socket. The regulatory inner peripheral surface is formed in a tapered shape whose inner diameter reduces as it approaches to the opening of the socket. A degree of the taper may be determined as a respective case requires.

The engager claw member may be provided with either the first member or the second member.

As for the urging member, various springs may be employed, for instance, a coil spring, a leaf spring and the like may be employed therefor.

When assembling the quick connector of the present invention, the first tube of the first member is inserted into the socket through the opening against an urging force of the urging member. When completing the insertion, the ring-shaped projection of the first member has got over the claw of the engager claw member. Under the circumstance, the engager claw member is urged by the urging force of the urging member in a direction of the central axial of the socket. As a result, the claw of the engager claw member is pressed onto the tapered regulatory inner peripheral surface of the socket.

When the claw is pressed onto the tapered regulatory inner peripheral surface of the socket, the claw is urged to the ring-shaped projection of the first member inwardly in a radial direction because of the taper of the tapered regulatory inner peripheral surface. Therefore, there are provided strong engagement forces in a direction being perpendicular to an axial direction as well as in a axial direction at the claw and the ring-shaped projection.

As having been described in detail so far, according to the quick connector of the present invention, the claw of the engager claw member is urged onto the tapered regulatory inner peripheral surface of the socket of second member by the urging force of the urging member, and thereby the claw is urged to the ring-shaped projection of the first member in a manner tightening and fastening the ring-shaped projection inwardly in a radial direction. Consequently, it is possible not only to enhance an engaging force of the claw of the engager claw member in a direction being perpendicular to an axial direction, but also to attain a strong engaging force in an axial direction. Therefore, the first member and the second member can be connected with a high reliability.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 1 is a side elevation view of a quick connector of a first preferred embodiment according to the present invention partly in section, and the side elevation view illustrates a process for connecting a first member and a second member of the quick connector thereof;

FIG. 2 is a side elevation view of the quick connector thereof partly in section, and the side elevation view illustrates another process for connecting the first member and the second member of the quick connector thereof;

FIG. 3 is a side elevation view of the quick connector thereof partly in section, and the side elevation view illustrates a still another process for connecting the first member and the second member of the quick connector thereof;

FIG. 4 is a side elevation view of the quick connector thereof partly in section, and the side elevation view illustrates a further process for connecting the first member and the second member of the quick connector thereof;

FIG. 5 is a side elevation view of a claw disengaging jig for disengaging a claw of an engager claw member of quick connector thereof whose upper part is illustrated in section;

FIG. 8 is a side elevation view of the quick connector thereof partly in section, and the side elevation view illustrates a still another process for connecting the first member and the second member of the quick connector thereof;

FIG. 9 is a side elevation view of the quick connector thereof partly in section, and the side elevation view illustrates a further process for connecting the first member and the second member of the quick connector thereof;

FIG. 10 is a side elevation view of an engager claw member of the quick connector thereof whose upper part is illustrated in section;

FIG. 11 is a front elevation view of the engager claw member of the quick connector thereof.

DETAILED DESCRIPTION OF THE PREFERRED EMBODIMENTS OF THE INVENTION

Figure 6:
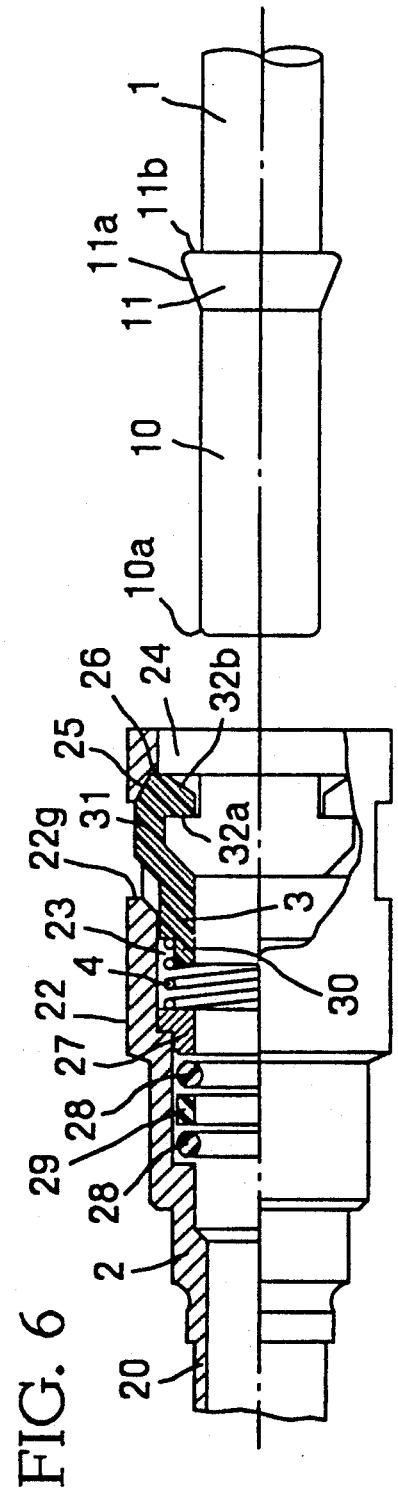
FIG. 6 is a side elevation view of a quick connector of a second preferred embodiment according to the present invention partly in section, and the side elevation view illustrates a process for connecting a first member and a second member of the quick connector thereof.

Having generally described the present invention, a further understanding can be obtained by reference to certain specific preferred embodiments which are provided herein for purposes of illustration only and are not intended to be limiting unless otherwise specified.

First Preferred Embodiment

A quick connector of a first preferred embodiment according to the present invention will be hereinafter described with reference to FIGS. 1 through 5. FIGS. 1 through 4 illustrate a side elevation view of the quick connector of the first preferred embodiment partly in section. Here, the terms "a front end" and "a rear end" as used herein refer respectively to "a left end" and "a right end" of component members illustrated in FIGS. 1 through 5. The quick connector of the first preferred embodiment comprises a first member 1, a second member 2, an engager claw member 3 and a spring 4 constituting an urging member.

The first member 1 includes a first tube 10 made of a metallic pipe and a ring-shaped projection 11 formed on an outer peripheral surface of the first tube 10 and projecting in a centrifugal direction. A tapered surface 11a is formed on the ring-shaped projection 11, and a substantially perpendicular rear surface 11b is formed at a rear of the tapered surface 11a. In addition, a rounded corner 10a is formed at a front end of the first tube 10.

The second member 2 includes a second tube 20 having a cylindrical shape and a socket 22. The socket 22 is screwed on a screw 20a formed on an outer peripheral surface of the second tube 20, and has a cylinder-shaped receiver hole 23. At a rear end of the receiver hole 23 of the socket 22, an opening 24 is formed in a circular shape, and a tapered regulatory inner peripheral surface 25 is further formed on an inner peripheral surface of the socket 22 at a side of the opening 24 in a ring shape going around an inner peripheral surface of the socket 22. The tapered regulatory inner peripheral surface 25 has a taper form whose diameter reduces as it approaches to the opening 24. At a rear end of the tapered regulatory inner peripheral surface 25, a perpendicular stopper surface 26 is formed. Further, a ring-shaped spring receiver 27 is provided on a steppped portion 20b of the second tube 20. Furthermore, two (2) O-rings 28 and a collar 29 are provided in a central hole 20c of the second tube 20. The O-rings 28 and the collar 29 are thus prevented from coming off by the ring-shaped spring receiver 27.

The engager claw member 3 is made of resin, and includes a ring-shaped base 30, a plurality of deformable arms 31, and a claw extending from an end of the arms 31. The base 30 is equipped with a spring seat surface 30a, provided in the receiver hole 23 of the socket 22, and made movable in a direction of the central axis of the socker 22. The claw engager member 3 is equipped with two (2) arms 31 which extend from an axial end surface of the ring-shaped base 30 to the opening 24 of the socket 22 in a direction of the central axis of the socket 22 in a fork-like shape. The claw 32 extends from an end of the arms 31, and includes an engaging surface 32a being substantially perpendicular to the central axis of the socket 22 and a tapered surface 32d inclined with respect to the central axis of the socket 22.

The spring 4 is a metallic coil spring. The spring 4 is positioned in the receiver hole 23 of the socket 22, and interposed between the spring reciever 27 and the spring seat surface 30a of the base 30 of the engager claw member 3. Before connecting the first member 1 and the second member 2, the spring 4 urges the engager claw member 3 to the opening 24 of the socket 22 in a direction of the central axis of the socket 22 as illustrated in FIG. 1, thereby bringing the claw 32 of the engager claw member 3 into contact with the tapered regulatory inner peripheral surface 25 and pressing the claw 32 thereof onto the stopper surface 26 simultaneously.

When assembling the quick connector of the first preferred embodiment, the first tube 10 of the first member 11 illustrated in FIG. 1 is inserted into the receiver hole 23 of the socket 22 of the second member 2 through the opening 24 of the socket 22 of the second member 2. As the first tube 10 is further inserted into the interior of the receiver hole 23 of the socket 22, the tapered surface 11a of the ring-shaped projection 11 of the first tube 10 pushes up the claw 32 as illustrated in FIG. 2, and the arm 31 flexes outwardly in a radial direction, i.e. a direction of the arrow "C2" of FIG. 2. At the same time, the spring 4 contracts in an axial direction. Further, when the ring-shaped projection 11 of the first tube 10 gets over the claw 32 as illustrated in FIG. 3, the arm 31 and the claw 32 flex in a direction of the arrow "C1" of FIG. 3, and recovers their original states. At this moment, since a spring force of the spring 4 acts in axial directions of the first tube 10 and the socket 22, the base of the engager claw member 3 is pressed in a direction of the central axis of the socket 22 and accordingly the claw 32 of the engager claw member 3 is pressed onto the tapered regulatory inner peripheral surface 25 of the socket 22 as illustrated in FIG. 4. As a result of the pressing, the claw 32 is heavily pressed inwardly in a radial direction, i.e., in a direction of the arrow "C1" of FIG. 4, and thereby the ring-shaped projeciton 11 of the first member 1 is reliably engaged with the claw 32 of the engager claw member 3.

As having been detailed so far, the first member 1 and the second member 2 can be connected with ease and in a short period of time in the quick connector of the first preferred embodiment, because the claw 32 of the engager claw member 3 can be automatically engaged with the ring-shaped projection 11 of the first member 1 and the tapered regulatory inner peripheral surface 25 of the second member 2 by simply inserting the first tube 10 of the first member 1 into the socket 22 of the second member 2, thereby substantially engaging second regulatory inner peripheral surface 33 against the outer diameter of the front end of first tube 10 of first member 1, to prevent the structure from moving freely in a direction perpendicular to an axial direction and in an axial direction.

Further, when the first member 1 and the second member 2 are connected, engaging forces are exerted between the claw 32 and the ring-shaped projection 11 in a direction being perpendicular to an axial direction as well as in an axial direction, because the claw 32 of the engager claw member 3 is pressed onto the regulatory inner peripheral surface 25 and urged inwardly in a radial direction, i.e., in a direction of the arrow "C1" of FIG. 4, by the spring force of the spring 4 as aforementioned and because the claw 32 works to tighten and fasten the ring-shaped projection 11 of the first member 1 inwardly in a radial direction. As a result, the first member 1 and the second member 2 are prevented from moving in a direction being perpendicular to an axial direction and in an axial direction getting away from each other, thereby avoiding rickety engagement between the first member 1 and the second member 2 in a direction being perpendicular to an axial direction and in an axial direction.

In addition, an internal pressure acts in a direction pressing the first tube 10, i.e., in a direction of the arrow "D1," during actual service as illustrated in FIG. 4, because the second member 2 is placed on a side of a fluid source. Accordingly, the rear surface 11b of the ring-shaped projection 11 of the first tube 10 in a close contact with the engaging surface 32a of the claw 32.

Thus, in the quick connector of the first preferred embodiment, the first member 1 and the second member 2 have been prevented from moving freely in a direction being perpendicular to an axial direction and in an axial direction as aforementioned. Consequently, in the quick connector of the first preferred embodiment, the reliability on the connection of the first member 1 and the second member 2 has been improved remarkably.

When the first member 1 and the second member 2 should be disconnected, a claw disengaging jig 5 is used. The claw disengaging jig 5 is made of resin, and includes a tube 52 having a through hole 50 and a tapered surface 51 formed at a front end thereof, and a flange 53. The following is apparent from FIGS. 4 and 5: When a front end of the tube 52 of the claw disengaging jig 5 is pressed into the opening 24 of the socket 22, the tapered surface 51a formed at a front end of the claw disengaging jig 5 is pressed onto the tapered surface 32d of the claw 32 of the engager claw member 3. Accordingly, the arm 31 of the engaging claw member 3 is flexed and the claw 32 is pushed up outwardly in a radial direction, i.e., in a direction of the arrow "C2" of FIG. 4, and thereby the engaging surface 32a of the claw 32 is disengaged from the ring-shaped projection 11. Under the circumstance in which the engaging surface 32a of the claw 32 is disengaged from the ring-shaped projection 11, the first member 1 and the second member 2 can be disconnected with ease and in a short period of time by pulling apart the first tube 10 of the first member 1 and the second tube 20 of the second member 2 in an axial direction.

Second Preferred Embodiment

A quick connector of a second preferred embodiment according to the present invention will be hereinafter described with reference to FIGS. 6 through 11. The quick connector basically has an arrangement similar to that of the quick connector of the first preferred embodiment, and component members performing similar functions and illustrated in FIGS. 6 through 11 will be designated at the same reference numerals as those of the quick connector of the first preferred embodiment. However, in the quick connector of the second preferred embodiment, a socket 22 is formed integrally with a second tube 20, and a plurality of openings 22g is formed in a peripheral wall of the socket 22 in a manner penetrating through the peripheral wall of the socket 22, and disposed at predetermined intervals in a circumferential direction of the socket 22. Here, the terms "a front end" and "a rear end" as used herein also refer respectively to "a left end" and "a right end" of the component members illustrated in FIGS. 6 through 11.

The quick connector of the second preferred embodiment basically operates and effects advantages in a manner similar to that of the quick connector of the first preferred embodiment. Likewise, when a first member 1 and a second member 2 are connected, an engaging force of a claw 32 of an engager claw member 3 can be enhanced in a direction being perpendicular to an axial direction, because the claw 32 is pressed onto a tapered regulatory inner peripheral surface 25 of the socket 22 and urged inwardly in a radial direction, i.e., in a direction of the arrow "C1" of FIG. 9, by a spring force of a spring 4 as illustrated in FIG. 9. As a result, the first member 1 and the second member 2 are prevented from getting away from each other in a direction being perpendicular to an axial direction, thereby avoiding the rickety engagement between the first member 1 and the second member 2 in a direction being perpendicular to an axial direction.

Further, similarly to the quick connector of the first preferred embodiment, an internal pressure resulting from a fluid flowing in a second tube acts in a direction pressing a first tube 10, i.e., in a direction of the arrow "D1" of FIG. 9 during actual service, Accordingly, a rear surface 11b of a ring-shaped projection 11 of the first tube 10 is in a close contact with an engaging surface 32a of the claw 32 as illustrated in FIG. 9. As a result, the engaging force of the claw 32 is enhanced in an axial direction, thereby securely preventing the first member 1 and the second member 2 from getting away from each other in an axial direction.

Figure 7:
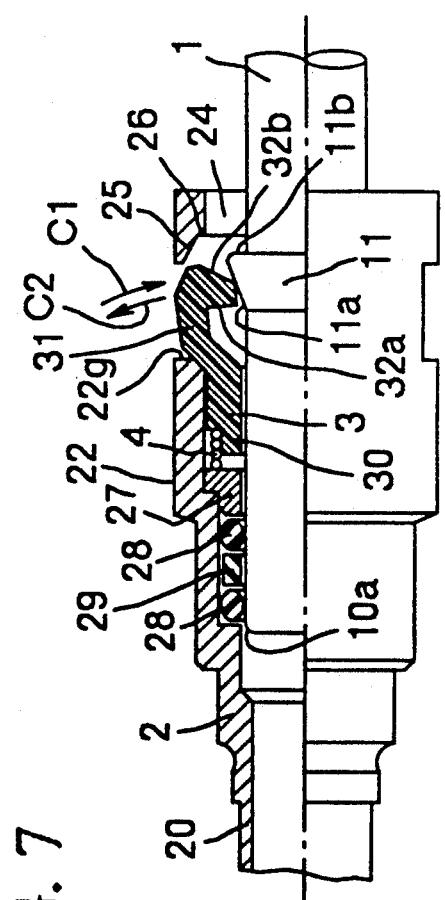
FIG. 7 is a side elevation view of the quick connector thereof partly in section, and the side elevation view illustrates another process for connecting the first member and the second member of the quick connector thereof.
Figure 12:
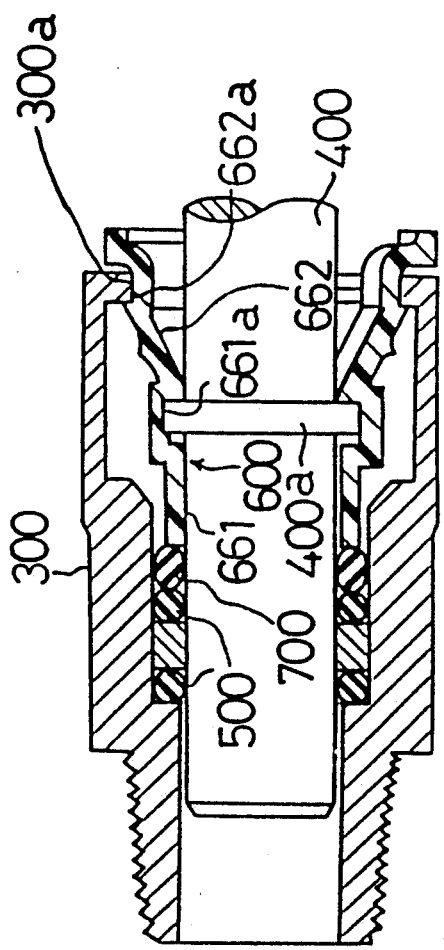
FIG. 12 is a side elevation view of a conventional connector whose upper part is illustrated in section.

Furthermore, since the socket 22 of the quick connector is provided with a plurality of the openings 22g which is formed to penetrate through the peripheral wall of the socket 22 and disposed at predetermined intervals in a circumferential direction of the socket 22, the arms 31 and the claws 32 of the engager claw member 3 which are deformed outwardly in a radial direction (or in a direction of the arrow "C2" of FIG. 7) can retract into the openings 22 without being interfered with the peripheral wall of the socket 22 when the ring-shaped projection 11 of the first tube 10 gets over the claw 32 of the engager claw member 3 as illustrated in FIG. 7. Therefore, this arrangement is advantageous to down-size a radial dimension of the socket 22 by a dimension of the retraction.

Moreover, in the quick connector of the second preferred embodiment, since an outer surface 32k of the claw 32 of the engager claw member 3 is positioned further inwardly with respect to an outer surface 22k of the socket 22 as illustrated in FIG. 9 when the first member 1 and the second member 2 are connected, such an arrangement is advantageous for preventing the claws 32 from getting in contact with a peripheral device accidentally.

Having now fully described the present invention, it will be apparent to one of ordinary skill in the art that many changes and modifications can be made thereto without departing from the spirit or scope of the present invention as set forth herein.

What is claimed is:

1. A quick connector comprising:
a tubular-shaped first member including a first tube having a predetermined outer diameter and a ring-shaped projection disposed on an outer peripheral surface of said first tube;

a tubular-shaped second member including a socket at an end thereof and a second tube having a cylindrical shape, said socket including a cylinder-shaped receiver hole having an opening for passage of a first end of said first tube of said first member therein, a central axis and a first regulatory inner peripheral surface having a reducing inner diameter as it approaches to said opening, said second tube including a second regulatory inner peripheral surface having substantially the same inner diameter as said outer diameter of said first end of said first tube of said first member;

an engager claw member disposed in said cylinder-shaped receiver hole interposed between an inner peripheral surface of said socket and an outer peripheral surface of said first tube in a manner being movable in a direction parallel to said central axis of said socket, said engager claw member including a ring-shaped base, a plurality of arms extending from said ring-shaped base to said opening in a direction parallel to said central axis of said socket, said arms being deformable in a radial direction, and a claw extending from an end of said arms and engaging with said ring-shaped projection of said first member when said first member is moved into said socket thereby expanding said arms so that said ring shaped projection will move past each said claw; and an urging member disposed in said cylinder-shaped receiver hole, having a length shorter than a length of said cylinder-shaped receiver hole in a direction parallel to said central axis of said socket, and urging said engager claw member to said opening of said socket in a direction parallel to said central axis of said socket to push said claw of said engaging claw member between said first regulatory inner peripheral surface of said socket and said outer peripheral surface of said first tube of said first member for urging each said claw radially inwardly thereby enhancing the engagement between said socket and said first tube.

2. The quick connector according to claim 1, wherein said ring-shaped projection of said first member includes a tapered surface at a front end thereof and a substantially perpendicular surface at a rear end thereof.

3. The quick connector according to claim 1, wherein said first tube of said first member includes a rounded corner at a front end thereof.

4. The quick connector according to claim 1, wherein said second tube has a screw formed on a peripheral surface thereof, and said socket is screwed on said second tube.

5. The quick connector according to claim 4, wherein said second tube of said second member includes a stepped portion formed at a rear end thereof and a ring-shaped urging member receiver disposed on said stepped portion.

6. The quick connector according to claim 5, wherein said second tube of said second member further includes at least one seal member disposed in a central hole of said second tube and prevented from coming off by said ring-shaped urging member receiver.

7. The quick connector according to claim 5, wherein said ring-shaped base of said engager claw member has a spring seat surface on a side thereof facing said ring-shaped urging member receiver, whereby said urging member is held between said ring-shaped urging member receiver and said spring seat surface of said ring-shaped based of said engager claw member.

8. The quick connector according to claim 1, wherein said tapered regulatory inner peripheral surface goes around inner peripheral surface of said socket in a ring-like shape.

9. The quick connector according to claim 1, wherein said tapered inner peripheral surface includes a perpendicular stopper surface at a rear end thereof.

10. The quick connector according to claim 1, wherein said claw of said engager claw member includes an engaging surface being substantially perpendicular to said central axis of said socket of said second member and a tapered surface inclined with respect to said central axis.

11. The quick connector according to claim 1, wherein said second tube and said socket are formed integrally with said second tube at a rear end thereof, and a plurality of openings formed in a peripheral wall of said socket in a manner penetrating through a peripheral wall of said socket and disposed at predetermined intervals in a circumferential direction of said socket into which said claw of said arms of said engager claw member and said arms of said engager claw member are retracted when connecting said first member and said second member.

12. The quick connector according to claim 1, wherein said socket of said second member covers said engager claw member.

13. A quick connector comprising:
a tubular-shaped first member including a first tube having a predetermined outer diameter and a ring-shaped projection disposed on an outer peripheral surface of said first tube;
a tubular-shaped second member including a socket at an end thereof and a second tube having a cylindrical shape, said socket including a cylinder-shaped receiver hole having an opening for passage of a first end of said first tube of said first member therein, and a first regulatory inner peripheral surface having an inner diameter decreasing in size toward said opening, said second tube including a second regulatory inner peripheral surface having substantially the same inner diameter as the outer diameter of an end of said first tube of said first member for engaging said end of said first tube disposed through said opening;
an engager claw member disposed in said cylinder-shaped receiver hole, and having a length shorter than a length of said cylinder-shaped receiver hole in a direction parallel to a central axis of said socket, said engager claw member interposed between an inner peripheral surface of said socket and an outer peripheral surface of said first tube and movable in a direction parallel to said central axis of said socket, said engager claw member including a ring-shaped base, a plurality of arms extending from said ring-shaped base to said opening in a direction parallel to said central axis of said socket, said arms being deformable in a radial direction, and a claw extending from an end of each of said arms and engaging with said ring-shaped projection of said first member when said first member is moved into said socket thereby expanding said arms so that said ring shaped projection will move past each said claw;
an urging member disposed in said cylinder-shaped receiver hole, urging said engager claw member to said opening of said socket in a direction parallel to said central axis of said socket to push said claw of said engaging claw member between said first regulatory inner peripheral surface of said socket and said outer peripheral surface of said first tube of said first member for urging each said claw radially inwardly thereby enhancing the engagement between said socket and said first tube; and
a disengaging member including a tube having a through hole inserted around said first member and a tapered surface formed at a forward end thereof, said tapered surface pressing said claws of said engaging claw member outwardly in a radial direction.

* * * * *